Patented Aug. 11, 1936

2,051,004

UNITED STATES PATENT OFFICE 2,051,004

PROCESS OF PRODUCING N-SUBSTITUTION PRODUCTS OF 1,4-DIAMINOANTHRAQUINONES

Karl Koeberle, Robert Schweizer, and Christian Steigerwald, Ludwigshafen-on-the-Rhine, Germany, assignors to General Aniline Works, Inc., New York, N. Y., a corporation of Delaware No Drawing. Application September 10, 1934, Serial No. 743,480. In Germany September 19, 1933

22 Claims. (Cl. 260—60)

The present invention relates to N-substitution products of 1,4-diaminoanthraquinones and a process of producing same.

We have found that N-substitution products of 1,4-diaminoanthraquinones can be obtained by condensing a stable reduction product of a 1,4-diaminoanthraquinone with an amine corresponding to the formula R.NH₂, wherein R stands for —OH, —NH₂, NH-aryl or an alkyl, aryl, aralkyl, cycloalkyl or heterocyclic radicle. The organic radicles therein may contain further substituents as for example halogen atoms, amino, alkylamino, arylamino, acylamino, nitro, hydroxy, alkoxy, aryloxy, acyl, cyano, mercapto, thiocyano, carboxylic or sulphonic acid or aldehyde groups. The amines may be employed as such or in the form of their salts with mineral acids.

The condensation usually takes place without the addition of a condensing agent and at atmospheric pressure, ammonia being evolved. If aromatic or heterocyclic amines are employed, it is, in many cases, of advantage to carry out the condensation in the presence of mineral acids such as halogen hydrides, sulphuric acid or nitric acid. The condensation may be carried out in the presence of an inert diluent as for example water, aliphatic alcohols, hydrocarbons, halogenated or nitrated hydrocarbons, ethers, ketones, aliphatic carboxylic acids of low molecular weight, such as formic, acetic or propionic acid, esters or other suitable organic diluents. When working in the presence of air or oxygen, especially when the amine is employed in excess, the N-substituted 1,4-diaminoanthraquinones themselves are obtained as reaction products. In other cases the corresponding stable reduction products are obtained which are converted, preferably without isolation, into the corresponding 1,4-diaminoanthraquinones in one operation by oxidation, as for example by leading in air or oxygen or by treatment with iron chloride or other suitable oxidizing agents, preferably in the presence of copper, copper salts or salts of vanadic acid. The oxidation may also be carried out with advantage in the presence of little amounts of a secondary or tertiary amine. Piperidine is especially suitable for this purpose. Besides the stable reduction product of 1,4-diaminoanthraquinone itself, the stable reduction products of 1,4-diaminoanthraquinones which are substituted in the 5- and/or 8 positions by hydroxy, alkoxy, amino or alkylamino groups or of 1,4-diaminoanthraquinones which are substituted in at least one of the positions 2 and 3 by halogen atoms or hydroxy, alkoxy, phenoxy, alkyl, carboxylic acid, carbonamide or cyano groups may be employed as initial materials. The stable reduction products of 1,4-di-monoalkylaminoanthraquinones may be employed as initial materials. In this case, the amine corresponding to the alkyl group contained in the said di- mono- alkylaminoanthraquinone is split off instead of ammonia. These stable reduction products will hereinafter briefly be named "leuco" compounds.

Amines suitable for the condensation are for example hydroxylamine, hydrazine, phenylhydrazine, naphthylhydrazine, nitrophenylhydrazine, phenyl hydrazine carboxylic acid, semicarbazide, the primary alkylamines, such as methylamine, ethylamine, ethylene diamine, propylamine, normal butylamine, isobutylamine, dodecylamine, ethanolamine (HO—CH₂—CH₂—NH₂), butanolamine (HO—CH₂—CH₂—CH₂—CH₂—NH₂), the primary halogenalkylamines, the primary arylamines, as for example aniline, the anisidines, the toluidines, the xylidines, the aniline carboxylic acids or their esters and nitriles, the aniline sulphonic acids, the toluidine sulphonic acids, the halogenanilines, the halogentoluidines, the primary aromatic nitroamines, the aminonaphthalenes, the phenylene diamines, aminodiphenyl, aminodiphenylamine, the monoacetylphenylene diamines, aminoanthraquinones, aminoanthrapyrimidines, aminoanthrapyrimidones, aminoanthrapyridones, aminobenzanthrones, aminoazabenzanthrones, aminopyrene, aminochrysene, aminofluorene, aminofluorenone and their derivatives. Aralkylamines, as for example benzylamine and phenylethylamine (C₆H₅—CH₂—CH₂—NH₂), -amino-1-methylnaphthalene and cycloalkylamines, as for example cyclohexylamine, aminotetrahydronaphthalene and their substitution products, heterocyclic amines, as for example aminopyridines, aminoquinolines, aminonaphthoquinolines, aminocarbazoles, aminodiphenyleneoxides, aminoacridines, aminoacridones and their derivatives may also be employed.

The reaction products are usually obtained in very good yields, excellent purity and in crystalline form. They may be employed in part as dyestuffs for dyeing acetyl cellulose or for coloring artificial compositions of various kinds, benzine or petroleum, lacquers, oils, waxes and paraffin waxes, and in part as intermediate products for the preparation of dyestuffs. If the products contain sulphonic acid groups which may be present in the initial materials or may be introduced by a subsequent treatment with sulphonating agents, they are suitable for dyeing animal fibres and, in some cases, for dyeing vegetable fibres.

The following examples will further illustrate how the said invention may be carried out in practice but the invention is not restricted to these examples. The parts are by weight.

Example 1

48 parts of leuco-1,4-diaminoanthraquinone are heated to boiling under reflux in 400 parts of water with 40 parts of 95 per cent normal butylamine until a sample withdrawn indicates that no unchanged initial material (orange-red leaflets) remains, which is usually the case after about 2 hours. The whole is allowed to cool, the deposited crystals are filtered off, the excess butylamine removed by washing with water and the crystals dried. The resulting leuco-1,4-dibutylaminoanthraquinone dissolves in alcohol giving a yellow-green coloration, in concentrated sulphuric acid giving a yellow coloration with a green fluorescence. In order to obtain 1,4-dibutylaminoanthraquinone, the leuco compound, preferably in alcoholic solution, is treated with iron chloride, hydrogen peroxide, air or oxygen, a little copper acetate preferably being added in the latter case. 1,4-dibutylaminoanthraquinone is obtained in the form of violet crystals. It dissolves in most organic solvents giving a pure blue coloration and may be employed for dyeing lacquers, benzine, petroleum, waxes and paraffin waxes also, in the sulphonated form, for dyeing wool.

The oxidation of the leuco compound to the corresponding anthraquinone derivative may also be carried out in conjunction with the condensation reaction without special isolation of the leuco compound.

Example 2

20 parts of leuco-1,4-diaminoanthraquinone are heated to boiling in 200 parts of cyclohexylamine for about 15 hours while supplying air. After cooling, the deposited dyestuff is filtered off by suction, washed with ethanol and water and dried. The 1,4-dicyclohexylaminoanthraquinone obtained in an excellent yield forms blue small needles which dissolve in concentrated sulphuric acid giving a yellow coloration and in organic solvents for example trichlorbenzene giving a pure blue coloration.

Example 3

10 parts of leuco-1,4-diaminoanthraquinone are heated to boiling in 100 parts of aniline while supplying air under reflux until no unchanged initial material can be detected which is usually the case after from 10 to 15 hours. When the blue-green solution is cooled, 1,4-dianilidoanthraquinone is deposited in the form of violet small needles which are separated from the mother liquor in the usual manner. They dissolve in organic solvents, for example in nitrobenzene or trichlorbenzene, giving a clear green-blue coloration and in concentrated sulphuric acid giving a brown-red coloration with a green-blue dichroism. After sulphonation the reaction product yields clear greenish blue dyeings on animal fibres.

Example 4

24.5 parts of leuco-1,4-diaminoanthraquinone are heated to boiling in 80 parts of ethanol with 70 parts of 95 per cent ethanolamine

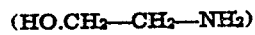
$(HO.CH_2-CH_2-NH_2)$ under reflux until unchanged initial material can no longer be detected, which is usually the case after from about 3 to 4 hours. The whole is allowed to cool, the reaction product which separates in a crystalline form is filtered off by suction (leaflets having a green lustre), washed with water and dried. The leuco compound of 1,4-dihydroxyethylaminoanthraquinone obtained may be converted by oxidation in the usual manner into the corresponding anthraquinone derivative which dyes acetate silk blue shades.

Example 5

A mixture of 48 parts of leuco-1,4-diaminoanthraquinone, 250 parts of ethanol and 60 parts of benzylamine is heated to boiling under reflux until unchanged initial material can no longer be detected. After adding 2 parts of copper acetate, oxygen is led into the solution until it has become blue-violet in color; it is then allowed to cool and the 1,4-dibenzylaminoanthraquinone which has been deposited in a crystalline form is filtered off by suction. It dissolves in organic solvents, for example in nitrobenzene or trichlorbenzene, giving a pure blue coloration.

Example 6

A mixture of 24 parts of leuco-1,4-diaminoanthraquinone and 15 parts of hydrazine hydrate is warmed in 320 parts of ethanol on the water bath while stirring. The reaction sets in before the mass begins to boil. The brown crystals of leuco-1,4-diaminoanthraquinone are converted in a short time into bright brown-yellow needles with splitting off of ammonia. The product which is leuco-1,4-dihydrazinoanthraquinone is obtained in a very good yield. It is separated from the dark red liquid, washed with alcohol and dried. When added cautiously to concentrated sulphuric acid it dissolves therein giving a green-yellow coloration. If this solution is warmed the coloration changes to red. The reaction may be carried out in methyl alcohol or water instead of ethyl alcohol.

In order to cause the reaction to go on smoothly it is preferable to allow the hydrazin hydrate to drop into the mixture.

If phenylhydrazine is used instead of hydrazine it is preferable to employ an excess of phenylhydrazine as a solvent. At about 100° C. leuco-1,4-bis-phenylhydrazinoanthraquinone is formed in a short time in the theoretical yield. It forms a finely crystallized heavy yellow powder.

If semicarbazide hydrochloride is used and the reaction is carried out in ethyl alcohol or water the corresponding semi-carbazide compound is obtained in the theoretical yield in the form of a brown-yellow crystalline powder.

Example 7

20 parts of leuco-1,4-diaminoanthraquinone are introduced into a melt of 100 parts of 8-aminoquinoline. The melt is stirred for about 15 hours at 130° C. with the access of air ammonia being split off during this treatment. The melt is diluted with ethanol while still warm.

The dyestuff is filtered off, washed with ethanol and dried; it is a dark-blue powder dissolving in nitrobenzene giving a green coloration. Its solution in concentrated sulphuric acid is violet. The product is 1,4-di-(quinolyl-8)-aminoanthraquinone.

Example 8

10 parts of leuco-1,4,5-triamino-8-hydroxyanthraquinone are heated with 100 parts of normal butylamine for about 15 hours at from 95° to 100° C. The green-blue melt is diluted with methanol and water. The 1,4-dibutylamino-5-amino-8-hydroxyanthraquinone precipitated is filtered off and washed with water. It dyes cellulose acetate yielding deep green-blue dyeings. Instead of normal butylamine ethanolamine may be used. In this case a dyestuff is obtained which dyes acetate silk similar shades.

Example 9

24 parts of 100 per cent leuco-1,4-diaminoanthraquinone, 18 parts of hydroxylamine hydrochloride and 800 parts of water are heated while stirring, until the crystals of leuco-1,4-diaminoanthraquinone have disappeared; a pulp of yellow needles has then been formed. The mass is filtered, the residue washed with water and recrystallized from diluted methanol, if desired, in order to remove any small amounts of leuco-1,4-diaminoanthraquinone The leuco-bis-hydroxylaminoanthraquinone which is thus obtained in a very good yield dissolves in diluted solutions of caustic soda giving a brown coloration. The alkaline solution is sensible to air. By oxidation with nitrobenzene a violet substance is formed therefrom. By heating the leuco-bis-hydroxylaminoanthraquinone with glacial acetic acid a violet reaction product is obtained yielding green vats; by oxidation with lead tetra-acetate in glacial acetic acid at low temperature a yellow-brown substance crystallizing in needles is obtained.

Example 10

20 parts of leuco-1,4-diaminoanthraquinone are introduced into a melt of 100 parts of para-anisidine while stirring. The melt is heated at 140° C. until ammonia no longer escapes. Air is then led through the melt for some hours. After cooling and adding methonal the reaction product is filtered off by suction and washed with ether. A dark violet powder is obtained dissolving in nitrobenzene giving a bluish-green coloration. It dissolves in concentrated sulphuric acid giving a blue coloration. When poured into water the reaction product is obtained in the form of green flakes. According to its properties it is 1,4-di-para-ansidinoanthraquinone. By treating with sulphonating agents it yields a dyestuff dyeing wool green shades from acid baths.

Example 11

48 parts of leuco-1,4-diaminoanthraquinone are suspended in 240 parts of para-toluidine and then heated, while stirring, at 150° C. in the presence of air until ammonia no longer escapes. After cooling, the mass is diluted with methanol, the reaction product filtered off by suction and washed with ether. It is obtained in the form of violent needles dissolving in organic solvents giving a bluish-green coloration. In concentrated sulphuric acid the reaction product dissolves giving a violet coloration. When poured into water the solution yields green flakes of 1,4-di-para-toluidoanthraquinone. By treating with oleum a dyestuff is obtained dyeing wool green shades from acid baths.

Example 12

24.5 parts of leuco-1,4-diaminoanthraquinone and 17 parts of mono-ethanolamine are introduced into 150 parts of nitrobenzene and heated, while stirring, for 5 hours to about 100° C. The reaction is completed by further heating at 150 to 160° for 1 hour. After cooling the reaction product is filtered off by suction and washed with ether. It is a blue crystalline powder having a copper-like glitter. It is 1,4-dihydroxyethyl-amino-anthraquinone and dyes acetyl cellulose clear blue shades.

Example 13

A suspension of 24.5 parts of leuco-1,4-diamino-anthraquinone is mixed with a solution of 32.3 parts of a 25 per cent aqueous solution of methylamine in 400 parts of water and heated, while stirring, until leuco-1,4-diamioanthraquinone can no longer be detected. Then the mass is cooled, filtered off by suction and washed with water. The reaction product is obtained in the form of green-glittering crystals in a good yield. Thus obtained leuco-1,4-di-monomethylaminoanthraquinone dyes acetyl cellulose green shades.

If the leuco-1,4-dimenthylamioanthraquinone is suspended in water or ethanol, a small amount of copper acetate and piperidine being added, it can be oxidized by passing air through the boiling solution to 1,4-dimethylaminoan-thraquinone dyeing acetyl cellulose blue shades.

Example 14

24.5 parts of leuco-1,4-diaminoanthraquinone are introduced into a solution of 28.8 parts of beta-phenylethylamine in 245 parts of methanol and boiled, while stirring, until ammonia no longer escapes. After some time solution takes place and the mixture assumes an orange coloration. After cooling yellow needles of the formed leuco compound separate. After adding 0.5 part of copper sulphate and 3 parts of di-butyl-amine the mixture is boiled. Then oxygen is led in until the leuco compound has been oxidized to the dyestuff. After cooling it is filtered off by suction and dried. A dark blue crystalline powder is obtained dissolving in trichlorbenzene giving a blue coloration, in concentrated sulphuric acid giving a weakly yellow coloration. It is most probably 1,4-di-beta-phenylethylamino-anthraquinone.

Example 15

24.5 parts of lueco-1,4-diaminoanthraquinone and 31.4 parts of beta-naphthylamine are suspended in 150 parts of trichlorbenzene. The suspension is then heated in the presence of air, while stirring, for 6 hours at 95° to 100° C. and then boiled until ammonia no longer escapes. After cooling the liquid is diluted with ether and the reaction product filtered off by suction. After washing with ether a dark blue powder is obtained dissolving in concentrated sulphuric acid giving a blue coloration and, after pouring the solution into water, yielding a green precipitate. The reaction product is 1,4-di-(beta-naphthyl)aminoanthraquinone. By treating with sulphonating agents a dyestuff is obtained which dyes animal fibres green shades from acid baths.

Example 16

24.5 parts of leuco-1,4-diaminoanthraquinone are suspended in a mixture of 32.2 parts of a 25 per cent aqueous solution of methylamine and 245 parts of methanol. The suspension is boiled, while stirring, until initial material can no longer be detected. The reaction product separates in the form of greenish crystals. When the reaction is complete oxygen is led through the boiling solution after adding 0.5 part of copper acetate and 3 parts of piperidine. The blue dyestuff thus formed separates in the form of blue crystals which are, after cooling, filtered off by suction, washed with water and dried. It is 1,4-di-monoethylaminoanthraquinone. The dyestuff dyes acetyl cellulose blue shades.

Example 17

81 parts of a 33 per cent aqueous solution of ethylamine are introduced into a suspension of 49 parts of leuco-1,4-diaminoanthraquinone in 200 parts of methanol. The reaction mixture is boiled, while stirring, until leuco-1,4-diaminoanthraquinone can no longer be detected. After cooling, the reaction product is filtered off by suction and washed with ether. Dark green crystals are obtained in a very good yield which dye acetyl cellulose green shades. By treating the thus obtained leuco-1,4-di-monoethylaminoanthraquinone with hydrogen peroxide in an acid solution or by treating it with sodium hypochlorite in an alkaline solution it can be converted into the 1,4-di-monoethylaminoanthraquinone which dyes acetyl cellulose very clear blue shades.

Example 18

49 parts of leuco-1,4-diaminoanthraquinone are introduced into a solution of 35 parts of normal propylamine in 100 parts of ethanol. The whole is boiled, while stirring, until leuco-1,4-diaminoanthraquinone can no longer be detected. After cooling the leuco-1,4-dipropylaminoanthraquinone is filtered off by suction, washed with ether and dried. It forms greenish dark glittering prisms.

In order to oxidize the leuco compound, 20 parts thereof are suspended in 100 parts of nitrobenzene. After adding 0.5 part of piperidine the whole is heated, while stirring, at 150° to 160° C. until the leuco compound can no longer be detected. After cooling the mixture is diluted with ethanol and the separated blue needles are filtered off by suction and washed with ether. The thus obtained 1,4-dipropylaminoanthraquinone dyes cellulose acetate blue shades.

Example 19

20 parts of leuco-1,4-diaminoanthraquinone are introduced into a melt of 100 parts of dodecylamine. The melt is stirred for 16 hours at 110° to 120° C. in the presence of air. The blue melt obtained is diluted with methanol. A blue dyestuff precipitates which is filtered off by suction and washed with methanol. The thus formed 1,4-di-monododecylaminoanthraquinone is almost insoluble in ethanol; it dissolves readily in ether, benzine and petroleum giving a blue coloration. It is also suitable for dyeing lacquers, paraffin waxes, oils and the like.

Example 20

41.1 parts of 4-toluidine-2-sulphonic acid are suspended in 300 parts of water and neutralized with the calculated amount of sodium hydroxide solution. After adding 24.5 parts of leuco-1,4-diaminoanthraquinone, the mixture is heated, while stirring, to about 100° C. until ammonia no longer escapes. Air is led through the solution until it has assumed a clear blue coloration. This solution dyes animal fibres dark blue shades from acid baths.

Example 21

24.5 parts of leuco-1,4-diaminoanthraquinone and 35.4 parts of 2-aminotetrahydronaphthalene are suspended in 200 parts of methanol. The suspension is heated, while stirring, under reflux until ammonia no longer escapes. By leading oxygen through this solution a dyestuff is obtained which, after cooling, is filtered off by suction and washed with ether. It is a blue powder dissolving in trichlorbenzene giving a blue-green coloration or in concentrated sulphuric acid giving a blue coloration. The product is 1,4-di-(tetrahydronaphthalyl-2)-aminoanthraquinone.

Instead of 2-amino-tetrahydronaphthalene 1-amino-tetrahydronaphthalene may be employed, the reaction proceeding somewhat more slowly.

Example 22

24.5 parts of leuco-1,4-diaminoanthraquinone and 37.7 parts of ω-amino-1-methylnaphthalene are suspended in 245 parts of methanol. The suspension is boiled, while stirring, until ammonia no longer escapes. When the reaction is completed the greenish yellow leuco compound formed is filtered off by suction and washed with ethanol.

The leuco compound is then suspended in nitrobenzene and, after the addition of a little piperidine, heated for 1 hour at 190° to 200° C. The solution assumes a blue coloration and, after cooling, a blue crystalline powder separates. The dyestuff thus obtained is probably the 1,4-di-(naphthyl-1-methyl-ω)-aminoanthraquinone.

Example 23

A suspension of 24.5 parts of leuco-1,4-diaminoanthraquinone and 42 parts of aminopyrene in 150 parts of trichlorbenzene is boiled, while stirring, until ammonia no longer escapes. After cooling, the reaction product is filtered off by suction, washed with ether and dried. It is an almost black powder which dissolves in concentrated sulphuric acid giving a blue coloration and yields a green precipitate when poured into water. By heating the sulphuric acid solution the blue color changes to violet. By adding water, a grey-brown precipitate is formed. The solution of the reaction product in trichlorbenzene has a green blue coloration.

Example 24

A suspension of 24.5 parts of leuco-1,4-diaminoanthraquinone and 48 parts of 2-aminoanthraquinone in 150 parts of trichlorbenzene is boiled until ammonia no longer escapes. After cooling the reaction product is filtered off by suction and washed with ethanol. It is a dark brown powder which dissolves in concentrated sulphuric acid giving a green coloration, in trichlorbenzene giving a red coloration. It dyes acetyl cellulose red shades.

Example 25

A mixture of 12.3 parts of leuco-1,4-diaminoanthraquinone, 16.3 parts of para-amino-beta-phenylethyl alcohol and 100 parts of trichlorbenzene are heated, while stirring, at 150° C. until ammonia no longer escapes. After cooling the reaction product is filtered off by suction, washed with ether and dried. A dark blue powder is obtained, which dissolves in concentrated sulphuric acid giving a blue coloration. In nitrobenzene and trichlorbenzene it yields also blue colorations. It dyes acetyl cellulose reddish blue shades from soap-baths.

Example 26

A suspension of 24.5 parts of leuco-1,4-diaminoanthraquinone in 200 parts of methanol, after the addition of 15.4 parts of a 78 per cent aqueous solution of ethylene diamine, is boiled, while stirring, until leuco-1,4-diamino-anthraquinone is no longer detectable. After cooling, the reaction product is filtered off by suction, washed with alcohol and ether and dried. It is a green powder, which is hardly soluble in cold nitrobenzene. It is somewhat better soluble in warm nitrobenzene giving a green coloration which turns blue if heating is continued.

Example 27

A suspension of 24.5 parts of leuco-1,4-diaminoanthraquinone and 31 parts of the hydrochloride of aniline in 250 parts of methanol is heated, while stirring, until initial material is no longer detectable. The ammonia split off is bound by the hydrogen chloride present to form ammonium chloride. When the reaction is complete, the new product, after cooling, is filtered off by suction, washed with methanol and carefully washed with water. After drying a crystalline substance is obtained which dissolves in concentrated sulphuric acid giving a yellowish green coloration. In nitrobenzene the substance dissolves yielding a brown coloration which, by further heating, turns blue green. After cooling blue crystals of 1,4-dianilidoanthraquinone separate from the solution.

Instead of methanol water may be employed as diluent. In this case the reaction product is obtained in the form of a tough mass. Instead of the hydrochloride of aniline its sulphate or its oxalate or its salts with other strong acids may be employed. Similar dyestuffs are obtained by employing the mineral acid salts of ortho-, meta- or para-toluidine instead of aniline.

Example 28

A suspension of 24.5 parts of leuco-1,4-diaminoanthraquinone and 27.1 parts of para-anisidine in 250 parts of methanol, after adding 23.2 parts of 34.5 per cent aqueous hydrochloric acid are boiled, while stirring, until the red crystals of the leuco-1,4-diaminoanthraquinone are no longer detectable, which is usually the case after 4 to 5 hours. After cooling the reaction product is filtered off by suction and washed with water. A greenish-grey powder is obtained which in concentrated sulphuric acid dissolves giving a yellow green coloration and in trichlorbenzene giving a yellow-brown coloration which does not change even in the heat. In nitrobenzene the substance is soluble giving a yellow-brown coloration which by heating for some time turns blue-green. The first reaction product is probably the leuco compound of 1,4-di-para-anisidino-anthraquinone which by heating with nitrobenzene is oxidized to 1,4-di-para-anisidino-anthraquinone. If this dyestuff is treated with sulphonating agents it dyes wool blue-green shades from acid baths.

Similar dyestuffs are obtained if instead of para-anisidine ortho- or meta-anisidine or ortho-, meta- or para-phenetidine are employed.

Example 29

A mixture of 150 parts of trichlorbenzene, 24.4 parts of leuco-1,4-diaminoanthraquinone and 43.6 parts of 2-aminocarbazole is boiled until ammonia no longer escapes. After cooling, the reaction product is filtered off by suction, washed with ether and dried. It forms blue needles which dissolve in concentrated sulphuric acid giving a green coloration. If this solution is poured into water a green precipitate is obtained. The compound dissolves in warm trichlorbenzene or nitrobenzene giving a green coloration. By treating with oleum the dyestuff is converted into the corresponding sulphonic acid which dyes wool clear green shades from acid baths.

Similar dyestuffs are obtained by employing 1-amino-or 3-aminocarbazole or 2-amino-N-ethylcarbazole instead of 2-aminocarbazole.

Example 30

24.5 parts of leuco-1,4-diaminoanthraquinone and 39.5 parts of beta-naphthylamine hydrochloride are introduced, while stirring, into 200 parts of methanol. The suspension is boiled until initial material is no longer detectable. After about 3 hours the mixture forms, when cooled, a red-brown crystalline mass. The thus formed leuco compound is filtered off by suction, washed with alcohol and water and dried. It is a red brown crystalline mass which is obtained in a quantitative yield. It dissolves in concentrated sulphuric acid giving a green coloration, in trichlorbenzene giving a brownish coloration. By dissolving it in nitrobenzene it gives a brownish coloration which, if heating is continued, turns green. 1,4 - di - beta - naphthylaminoanthraquinone is thus obtained.

If instead of beta-naphthylamine hydrochloride alpha-naphthylamine hydrochloride is employed, in an analogous manner 1,4-di-alpha-naphthylaminoanthraquinone is obtained.

Example 31

A suspension of 24.5 parts of leuco-1,4-diaminoanthraquinone and 40 parts of para-phenylenediamine hydrochloride in 250 parts of methanol is boiled until initial material can no longer be detected. After cooling, the crystalline mass formed is filtered off by suction, washed with alcohol and water and dried. The reaction product is a dark crystalline powder which dissolves in concentrated sulphuric acid giving a green coloration. It dissolves in cold nitrobenzene giving a brown coloration which by heating the solution turns green blue. It is most probably 1,4-di-(para-aminophenyl)-aminoanthraquinone.

Similar reaction products are obtained by employing ortho- or meta-phenylene diamine. Instead of the hydrochloride salts of phenylene diamine with other acids may also be employed.

Example 32

A suspension of 24.5 parts of leuco-1,4-diaminoanthraquinone and 49.1 parts of 1-aminoanthraquinone in 400 parts of metanol are heated to boiling, while stirring and leading in hydrogen chloride, until leuco-1,4-diaminoanthraquinone is no longer detectable. The hydrochloride of the dyestuff formed separates in the form of brown crystals. When the reaction is complete, the new compound, after cooling, is filtered off by suction and washed with methanol. If the brown reaction product is washed with water its color turns brown violet. After drying a brown violet powder is obtained which dissolves in concentrated sulphuric acid giving a yellow coloration. It dissolves in nitrobenzene or trichlorbenzene giving a red coloration. The new dyestuff dyes acetyl cellulose red shades from soap-baths.

Example 33

Hydrogen chloride is led into a boiling suspension of 24.5 parts of leuco-1,4-diaminoanthraquinone and 49.1 parts of 2-aminoanthraquinone in 400 parts of methanol. A red brown powder is obtained which dissolves in concentrated sulphuric acid giving a yellow green coloration and in nitrobenzene or trichlorbenzene giving a violet red coloration. The dyestuff dyes acetyl cellulose violet red shades from soap-baths.

Similar products are obtained if substitution products of 2-aminoanthraquinone are employed as for example 2-amino-3-hydroxyanthraquinone, 2-amino-3-bromanthraquinone or 2,6-diaminoanthraquinone.

Example 34

A suspension of 24.5 parts of leuco-1,4-diaminoanthraquinone and 14.9 parts of the hydrochloride of methylamine in 200 parts of methanol is boiled, while stirring, until initial material can no longer be detected. The solution is then rendered alkaline by means of sodium hydroxide solution. A stream of oxygen is led through the boiling solution for several hours. The reaction product is obtained in the form of long blue needles. It is identical with the compound obtainable according to Example 16.

Example 35

A suspension of 24.5 parts of leuco-1,4-diaminoanthraquinone and 35.1 parts of the hydrochloride of para-anisidine in 250 parts of methanol is boiled, while stirring, until initial material is no longer detectable. Then 0.5 part of copper acetate and 3 parts of piperidine are added. A stream of oxygen is then led through the boiling solution for several hours. After cooling, the reaction product is filtered off by suction and washed with methanol and water. The thus obtained 1.4-di-para-anisidinoanthraquinone is a deep-blue powder which, in thin layers, has a bluish green coloration. It dissolves in nitrobenzene and trichlorbenzene giving a blue green coloration, in concentrated sulphuric acid giving a blue coloration.

By treating the thus formed compound with sulphonating agents a dyestuff is obtained which dyes animal fibres blue green shades.

Example 36

Into a suspension of 24.5 parts of leuco-1,4-diamino-anthraquinone and 68.2 parts of 1-amino-4-benzoylaminoanthraquinone in 400 parts of methanol dry gaseous hydrogen chloride is led in. The suspension is boiled, while stirring, until leuco-1,4-diaminoanthraquinone can no longer be detected. A precipitate is obtained which, after cooling, is filtered off by suction. Blue violet crystals of the hydrochloride of the reaction product are obtained which by washing with water are converted into a compound which has a brown violet coloration. The reaction product, after drying, is a brown violet crystalline powder which dissolves in nitrobenzene and trichlorbenzene giving a red violet coloration. It dyes acetyl cellulose bluish red shades.

If instead of 1-amino-4-benzoylaminoanthraquinone 1-amino-4-methoxyanthraquinone is employed, a product is obtained which yields similar shades. By employing 1-amino-5-benzoylaminoanthraquinone a reaction product yielding red shades is obtained.

Example 37

A suspension of 24.5 parts of leuco-1,4-diaminoanthraquinone in 300 parts of methanol are boiled, while stirring and leading in gaseous hydrogen chloride. If the leuco-1,4-diaminoanthraquinone can no longer be detected, the formed crystalline mass is cooled. The reaction product is then filtered off by suction and washed with alcohol and ether. The yellow-brown product is the hydrochloride of the reaction product. The dye-stuff itself may be obtained by adding diluted ammonia. It dyes cellulose acetate bluish-red shades which are different from that of the 1,4-diaminoanthraquinone.

Similar products are obtained if substitution products of leuco-1,4-diaminoanthraquinone are employed, as for example leuco-1,4,5-triaminoanthraquinone, leuco - 1,4 - diamino-5,8-dioxyanthraquinone or leuco-1,4-diamino-2-methylanthraquinone.

Example 38

24.5 parts of leuco-1,4-diaminoanthraquinone and 31.8 parts of the hydrochloride of phenylhydrazine are introduced into 245 parts of methanol and boiled until the leuco-1,4-diaminoanthraquinone can no longer be detected. After cooling, the mass is filtered off by suction, washed with methanol and water and dried. The reaction product is a yellow-brown crystalline product which is soluble in concentrated sulphuric acid giving a green coloration. It is identical with the product described in the second paragraph of Example 6.

Example 39

24.5 parts of leuco-1,4-diaminoanthraquinone and 35.4 parts of 1-amino-tetrahydronaphthalene are introduced in to 245 parts of methanol and boiled after the addition of 25.5 parts of 34.5 per cent aqueous hydrochloric acid, while stirring, until the initial material is no longer detectable. After cooling, the tough mass is separated from the liquid and dried. A green pulverizable mass is obtained which dissolves in nitrobenzene, giving a greenish-brown coloration which by heating turns green. It dissolves in concentrated sulphuric acid giving a yellow-green coloration.

If instead of 1-amino-tetrahydronaphthalene 2-amino-tetrahydronaphthalene is employed a similar dyestuff is obtained.

Example 40

24.5 parts of leuco-1,4-diaminoanthraquinone and 23.5 parts of benzylamine are introduced into a mixture of 245 parts of methanol and 23.2 parts of 34.5 per cent hydrochloric acid. The mixture is boiled, while stirring, until initial material is no longer detectable. After working up in the usual manner a green-yellow crystalline powder is obtained which, when dried in the presence of air, assumes a violet coloration. It is then soluble in nitrobenzene or trichlorbenzene giving a blue-violet coloration. It dyes acetyl cellulose violet shades from soap-baths. It dissolves in concentrated sulphuric acid giving a yellow coloration.

Similar products are obtained if instead of benzylamine beta-phenylethylamine or ω-amino-1-methylnaphthalene or instead of leuco-1,4-diaminoanthraquinone its substitution products substituted by amino, hydroxy or carboxylic acid groups in the anthraquinone nucleus are employed.

Example 41

24.5 parts of leuco-1,4-diaminoanthraquinone and 21.6 parts of cyclohexylamine are introduced into a mixture of 34.5 per cent aqueous hydrochloric acid and 245 parts of methanol. The liquid is boiled, while stirring, until initial material can no longer be detected. 15 parts of sodium hydroxide solution (35° Bé.) are then added to the orange-red solution, and oxygen is led through the solution for several hours. After cooling, the reaction product separated in the form of blue crystals is sucked off and washed with water. It is a blue crystalline powder which dissolves in concentrated sulphuric acid giving a yellow coloration and in nitrobenzene and trichlorbenzene giving a blue coloration. It dyes acetyl cellulose blue-violet shades.

Example 42

24.5 parts of leuco-1,4-diaminoanthraquinone and 43.5 parts of 3,4-dichloraniline in the form of its hydrochloride are introduced into 250 parts of methanol. The suspension is boiled, while stirring, until initial material is no longer detectable. After cooling, the reaction product is filtered off by suction and washed with water. It is a blue powder, dissolving in concentrated sulphuric acid giving a green-blue coloration, in nitrobenzene or trichlorbenzene giving a blue coloration. By treating with oleum a sulphonic acid of the dyestuff is obtained which dyes animal fibres blue shades.

Instead of the hydrochloride of 3,4-dichloraniline other salts thereof as for example its nitrate or sulphate may be employed. Similar dyestuffs are obtained if instead of dichloraniline other substitution products of aniline or halogen substitution products of the toluidines, xylidines, aminonaphthalenes or of aminodiphenyl are employed.

Example 43

24.5 parts of leuco-1,4-diaminoanthraquinone and 27 parts of para-amino benzoic acid are introduced into 250 parts of methanol. After addition of 23.5 parts of 34.5 per cent aqueous hydrochloric acid the suspension is boiled, while stirring, until initial material is no longer detectable. After cooling, the blue-brown reaction product is filtered off by suction and washed with water. It dissolves in concentrated sulphuric acid giving a green coloration and in aqueous ammonia solution giving a blue coloration.

Similar products are obtained if for example ortho- or meta-aminobenzoic acids, amino naphthalene carboxylic acids, aminodiphenyl carboxylic acids, aminodiphenyl amino carboxylic acids are employed. In many cases, instead of the said carboxylic acid esters or amides thereof may be employed.

Example 44

24.5 parts of leuco-1,4-diaminoanthraquinone and 32 parts of the hydrochloride of para-aminophenol are introduced into 200 parts of methanol and treated in the manner described. A brownish-yellow crystalline powder is obtained which dissolves in sodium hydroxide solution giving an orange-red coloration. By heating this solution oxidation takes place. By adding acids a blue dyestuff precipitates which dissolves in nitrobenzene giving a blue coloration. It is leuco-1,4-di-(para-hydroxyphenyl)-amino-anthraquinone.

Similar products are obtained by employing the hydrochlorides of ortho- or meta-aminophenol.

Example 45

Through a suspension of 12.3 parts of leuco-1,4-diaminoanthraquinone and 24.7 parts of 4-amino-1,9-anthrapyrimidine hydrogen chloride is led while stirring. The suspension is heated for some time and cooled. The reaction product is isolated in the usual manner. It dyes acetyl cellulose red shades.

Instead of 4-amino-1,9-anthrapyrimidine the 2,3,5,6 or 8-amino-anthrapyrimidines may be employed.

Example 46

A suspension of 24.5 parts of leuco-1,4-diamino anthraquinone and 31.7 parts of 8-aminoquinoline in 245 parts of methanol is boiled, after the addition of 23.2 parts of aqueous 34.5 per cent hydrochloric acid, while stirring, until initial material is no longer detectable. After working up, a dark-blue powder is obtained which dissolves in oleum giving a red-violet coloration. By this treatment, sulphonation takes place. The thus obtained sulphonic acid dyes wool violet shades. The sulphonic acid has also affinity to vegetable fibres.

Similar products are obtained if 3- or 6-aminoquinoline or 2-aminoquinoline are employed.

Example 47

A suspension of 24.5 parts of leuco-1,4-diaminoanthraquinone and 48.5 parts of 4-amino-diphenyl-amine hydrochloride in 200 parts of trichlorbenzene is boiled, while stirring, in the presence of air at 180° C. until the solution has assumed a blue-green coloration. After working up, blue needles are obtained which dissolve in concentrated sulphuric acid, in trichlorbenzene and in nitrobenzene giving a bluish-green coloration. By sulphonation a sulphonic acid is obtained which dyes animal fibres blue green shades from acid baths.

Instead of trichlorbenzene ethanol may be employed as a diluent. In this case the working-temperature is at about the boiling point of ethanol, and the leuco compound is obtained as a brown-red powder which by oxidation may be converted into the blue-green dyestuff.

Similar dyestuffs are obtained if amino-diphenylene oxide is employed as starting material.

Example 48

A suspension of 12.3 parts of leuco-1,4,5-triaminoanthraquinone and 13 parts of aniline hydrochloride in 150 parts of methanol is boiled, while stirring, until the reaction is complete. After working up, a brown powder is obtained which dissolves in concentrated sulphuric acid, nitrobenzene or trichlorbenzene giving an orange coloration. The solution in nitro benzene turns red by heating. The dyestuff dyes acetyl cellulose bluish red shades.

Instead of aniline hydrochloride the salts of other aromatic amines as for example of the toluidines, xylidines, anisidines, chloranilines and aminonaphthalenes may be employed. In these cases similar dyestuffs are obtained.

Example 49

A suspension of 12.3 parts of leuco-1,4-diaminoanthraquinone and 20.2 parts of 2-aminoanthracene in 200 parts of methanol is heated after an addition of 12 parts of concentrated hydrochloric acid, while stirring, until initial material is no longer detectable. After working up, a greenish powder is obtained which dissolves in nitrobenzene giving a brown coloration which by addition of a little piperidine and heating turns green. In concentrated sulphuric acid it dissolves giving an orange-red coloration.

Example 50

12.3 parts of leuco-1,4-diaminoanthraquinone and 19.5 parts of the hydrochloride of beta-naphthylhydrazine are introduced into 130 parts of methanol. The suspension is boiled, while stirring, for several hours and worked up in the usual manner. A brownish yellow crystalline powder is obtained which dissolves in concentrated sulphuric acid giving an orange coloration. It dissolves in nitrobenzene giving an orange coloration which, after addition of a little piperidine and heating, turns red.

Example 51

A mixture of 13.6 parts of leuco-1,4-diamino-5,8-dihydroxyanthraquinone, 16.5 parts of a 25 per cent aqueous solution of methylamine and 140 parts of methanol are boiled, while stirring, until initial material is no longer detectable. After adding 0.5 part of copper acetate and 3.0 parts of piperidine oxygen is led through the boiling solution, until it has assumed a blue coloration. After cooling the reaction product is filtered off by suction and washed with methanol and then with water. 1,4-di-monomethylamino-5,8-dihydroxyanthraquinone is obtained in the form of a blue powder which dyes acetyl cellulose blue shades.

Instead of methylamine ethylamine, propylamine, butylamine, amylamine, ethanolamine, propanolamine, butanolamine or other aliphatic amines may be employed.

Example 52

A mixture of 12.3 parts of leuco-1,4,5-triaminoanthraquinone, 15 parts of a 25 per cent aqueous solution of methylamine, and 130 parts of methanol is boiled, while stirring, until initial material is no longer detectable. After adding 0.5 part of copper acetate and 3.0 parts of piperidine air is led through the boiling solution until it has assumed a blue coloration. After cooling, the dyestuff is filtered off by suction and washed with methanol and water. The thus formed 1,4 - di-monomethylamino-5-aminoanthraquinone is a blue powder which dissolves in nitrobenzene or trichlorbenzene giving a blue coloration. It dyes acetyl cellulose navy blue shades.

Similar dyestuffs are obtained if instead of methylamine other alkylamines, as for example ethylamine, propylamine, butylamine or amylamine or hydroxyalkylamines, as for example ethanolamine, propanolamine or butanolamine are employed.

Example 53

A suspension of 13.4 parts of leuco-1,4-di-mono-methylaminoanthraquinone and 12.8 parts of para-chloraniline in 130 parts of methanol is boiled, while stirring, in the presence of air after the addition of 12 parts of 34.5 per cent aqueous hydrochloric acid, until initial material is no longer detectable. After working up, 1,4-di-para-chloranilidoanthraquinone is obtained in the form of a greenish powder which dissolves in concentrated sulphuric acid giving a bluish-green coloration and in oleum giving a blue coloration.

Example 54

A suspension of 24.5 parts of leuco-1,4-diaminoanthraquinone and 33 parts of para-aminoacetanilide in 250 parts of methanol is boiled after the addition of 23.5 parts of 34.5 per cent hydrochloric acid, while stirring, until initial material is no longer detectable. After cooling the reaction product is filtered off by suction, washed with methanol and water and dried. The thus formed leuco compound which is a brown powder can be oxidized by heating its solution in nitrobenzene in the presence of a little piperidine into a blue green dyestuff. By treating it with sulphonating agents a dyestuff is obtained which dyes wool blue-grey shades.

The reaction may also be carried out by employing trichlorbenzene instead of methanol at 180° C. and without the addition of hydrochloric acid.

Example 55

A suspension of 12.3 parts of leuco-1,4-diaminoanthraquinone and 18.9 parts of para-bromaniline in a mixture of 130 parts of methanol and 12 parts of 34.5 per cent aqueous hydrochloric acid is boiled, while stirring, until initial material is no longer detectable. After cooling leuco-1,4-di-para-bromanilidoanthraquinone is obtained in the form of a greenish powder. It can be oxidized by heating its solution in nitrobenzene in the presence of a little piperidine into a blue dyestuff.

Instead of para-bromaniline other mono- or poly-bromanilines or toluidines, xylidines or anisidines containing at least one bromine atom may be employed.

Example 56

A suspension of 13.4 parts of leuco-1,4-di-monomethylaminoanthraquinone and 15.8 parts of para-toluidine hydrochloride in 130 parts of methanol is boiled in the presence of air, while stirring. After working up, a blue dyestuff (being 1,4-di-paratoluidinoanthraquinone) is obtained which dissolves in concentrated sulphuric acid giving a blue coloration and in nitrobenzene giving a blue green coloration. After sulphonation by means of oleum, a dyestuff is obtained which dyes animal fibres green shades.

Instead of para-toluidine hydrochloride the hydrochlorides of other arylamines may be employed.

Example 57

A mixture of 17.6 parts of leuco-1,4-di-mono-butyl-aminoanthraquinone and 40 parts of para-toluidine is boiled until butylamine is no longer split off. After working up, a blue powder is obtained which is identical to the dyestuff described in the preceding example.

Blue to green dyestuffs of a similar constitution are obtained by employing other arylamines instead of para-toluidine. In some cases a diluent, such as trichlorbenzene, may advantageously be employed.

Example 58

A suspension of 24.5 parts of leuco-1,4-di-aminoanthraquinone and 53.5 parts of aminochrysene in 150 parts of trichlorbenzene is heated, while stirring, at 180° C., until ammonia no longer escapes. After cooling, the reaction product is filtered off by suction and washed with ethanol and ether. It is a dark green powder which dissolves in concentrated sulphuric acid giving a blue coloration and in nitrobenzene giving a green coloration. By treating with oleum a dyestuff is obtained which dyes wool yellowish-green shades.

Example 59

A mixture of 12.3 parts of leuco-1,4-diaminoanthraquinone, 11.5 parts of monohydroxyethylethylene-diamine and 120 parts of methanol is boiled, while stirring, and worked up in the usual manner. 1,4-di-(monohydroxy-ethylaminoethyl)-aminoanthraquinone is obtained in the form of a violet brown crystalline powder which dissolves in nitrobenzene or trichlorbenzene giving a blue coloration.

Example 60

A mixture of 12.3 parts of leuco-1,4-diaminoanthraquinone, 13.4 parts of N-phenyl-ethylenediamine and 130 parts of methanol is boiled, while stirring, and worked up after several hours. The reaction product is a brownish-yellow crystalline powder. It dissolves in nitrobenzene giving a brownish-yellow coloration which by heating, especially after the addition of a little piperidine, turns blue. After cooling, 1,4-di-(N-phenylamino-ethyl)-aminoanthraquinone crystallizes out in the form of blue needles.

Example 61

A mixture of 24.5 parts of leuco-1,4-diaminoanthraquinone, 18 parts of propanolamine and 245 parts of methanol is boiled, while stirring, until initial material is no longer detectable. After the addition of 0.5 part of copper acetate and 3.0 parts of piperidine oxygen is led through the solution, until it has assumed a blue coloration. After cooling, the reaction product is filtered off by suction and washed with methanol and water. 1,4-di-(hydroxypropyl)-aminoanthraquinone is obtained in the form of blue needles which dye acetyl cellulose blue shades.

Example 62

A suspension of 24.5 parts of leuco-1,4-diaminoanthraquinone and 41.5 parts of para-amino-1-phenyl-3-methylpyrazolone-5 in 150 parts of trichlorbenzene is heated in the presence of air, while stirring, at 180° C, until ammonia no longer escapes. After cooling and adding methanol, the reaction product is filtered off by suction, washed with methanol and ether and dried. It is a blue powder which dissolves in concentrated sulphuric acid giving a green coloration and in nitrobenzene giving a blue coloration.

Example 63

A mixture of 24.5 parts of leuco-1,4-diaminoanthraquinone, 17.5 parts of butylamine and 250 parts of methanol is stirred at room temperature in the presence of air, until initial material can no longer be detected. The reaction product separates in the form of blue needles which are filtered off by suction, washed with methanol and dried. The thus formed 1,4-dibutylaminoanthraquinone dyes acetyl cellulose blue shades.

What we claim is:

1. A process of producing N-substitution products of 1,4-diaminoanthraquinones which comprises condensing a leuco compound of a 1,4-diaminoanthraquinone with at least two molecular proportions of an amine corresponding to the formula $R.NH_2$ wherein R stands for a member of the group consisting of —OH, —$NH_2$, —NH-aryl, alkyl, aryl, aralkyl, cycloalkyl and heterocyclic radicals.

2. A process of producing N-substitution products of 1,4-diaminoanthraquinones which comprises condensing a leuco compound of a 1,4-diaminoanthraquinone with at least two molecular proportions of an amine corresponding to the formula $R.NH_2$ wherein R stands for a member of the group consisting of —OH, —$NH_2$, —NH-aryl, alkyl, aryl, aralkyl, cycloalkyl, and heterocyclic radicals in the presence of an acid condensing agent.

3. A process of producing N-substitution products of 1,4-diaminoanthraquinones which comprises condensing a leuco compound of a 1,4-diaminoanthraquinone with at least two molecular portions of an amine corresponding to the formula $R.NH_2$ wherein R stands for a member of the group consisting of —OH, —$NH_2$, —NH-aryl, alkyl, aryl, aralkyl, cycloalkyl and heterocyclic radicals in the presence of a mineral acid.

4. A process of producing N-substitution products of 1,4-diaminoanthraquinones which comprises condensing a leuco compound of a 1,4-diaminoanthraquinone with at least two molecular proportions of a mineral acid salt of an amine corresponding to the formula $R.NH_2$ wherein R stands for a member of the group consisting of —OH, —$NH_2$, —NH-aryl, alkyl, aryl, aralkyl, cycloalkyl and heterocyclic radicals.

5. A process of producing N-substitution products of 1,4-diaminoanthraquinones which comprises condensing a leuco compound of a 1,4-diaminoanthraquinone with at least two molecular proportions of an amine corresponding to the formula $R.NH_2$ wherein R stands for a member of the group consisting of —OH, —$NH_2$, —NH-aryl, alkyl, aryl, aralkyl, cycloalkyl and heterocyclic radicals in the presence of an oxidizing agent.

6. A process of producing N-substitution products of 1,4-diaminoanthraquinones which comprises condensing a leuco compound of a 1,4-diaminoanthraquinone with at least two molecular proportions of an amine corresponding to the formula $R.NH_2$ wherein R stands for a member of the group consisting of —OH, —$NH_2$, —NH-aryl, alkyl, aryl, aralkyl, cycloalkyl, heterocyclic radicals in the presence of oxygen.

7. A process of producing N-substitution products of 1,4-diaminoanthraquinones which comprises condensing a leuco compound of a 1,4-diaminoanthraquinone with an amine corresponding to the formula $R.NH_2$ wherein R stands for a member of the group consisting of —OH, —$NH_2$, —NH-aryl, alkyl, aryl, aralkyl, cycloalkyl and heterocyclic radicals in the presence of a substance containing copper.

8. A process of producing N-substitution products of 1,4-diaminoanthraquinones which comprises condensing a leuco compound of a 1,4-diaminoanthraquinone with an amine corresponding to the formula $R.NH_2$ wherein R stands for a member of the group consisting of —OH, —$NH_2$, —NH-aryl, alkyl, aryl, aralkyl, cycloalkyl and heterocyclic radicals in the presence of copper and of an organic base selected from the class consisting of secondary and tertiary amines.

9. A process of producing N-substitution products of 1,4-diaminoanthraquinones which comprises condensing a leuco compound of a 1,4- diaminoanthraquinone with an amine corresponding to the formula R.NH₂ wherein R stands for a member of the group consisting of —OH, —NH₂, —NH-aryl, alkyl, aryl, aralkyl, cycloalkyl and heterocyclic radicles in the presence of piperidine.

10. A process of producing N-substitution products of 1,4-diaminoanthraquinones which comprises condensing a leuco compound of a 1,4-diaminoanthraquinone with at least two molecular proportions of an amine corresponding to the formula R.NH₂ wherein R stands for a member of the group consisting of —OH, —NH₂ —NH-aryl, alkyl, aryl, aralkyl, cycloalkyl and heterocyclic radicles in the presence of an inert diluent.

11. A process of producing N-substitution products of 1,4-diaminoanthraquinones which comprises condensing a leuco compound of a 1,4-diaminoanthraquinone with an amine corresponding to the formula R.NH₂ wherein R stands for a member of the group consisting of —OH, —NH₂, —NH-aryl, alkyl, aryl, aralkyl, cycloalkyl and heterocyclic radicles in the presence of water.

12. A process of producing N-substitution products of 1,4-diaminoanthraquinones which comprises condensing a leuco compound of a 1,4-diaminoanthraquinone with at least two molecular proportions of an amine corresponding to the formula R.NH₂ wherein R stands for a member of the group consisting of —OH, —NH₂, —NH-aryl, alkyl, aryl, aralkyl, cycloalkyl and heterocyclic radicles in the presence of an aliphatic alcohol of low molecular weight.

13. A process of producing N-substitution products of 1,4-diaminoanthraquinones which comprises condensing a leuco compound of a 1,4-diaminoanthraquinone with an amine corresponding to the formula R.NH₂ wherein R stands for a member of the group consisting of —OH, —NH₂, —NH-aryl, alkyl, aryl, aralkyl, cycloalkyl and heterocyclic radicles in the presence of trichlorbenzene.

14. A process of producing N-substitution products of 1,4-diaminoanthraquinones which comprises condensing a leuco compound of 1,4-diaminoanthraquinone with at least two molecular proportions of an amine corresponding to the formula R.NH₂ wherein R stands for a member of the group consisting of —OH, —NH₂, —NH-aryl, alkyl, aryl, aralkyl, cycloalkyl and heterocyclic radicles.

15. A process of producing N-substitution products of 1,4-diaminoanthraquinones which comprises condensing a leuco compound of a 1,4-diaminoanthraquinone containing in each of the amino groups an alkyl group with at least two molecular proportions of a cyclic primary amine.

16. 1,4-diaminoanthraquinones corresponding to the general formula:

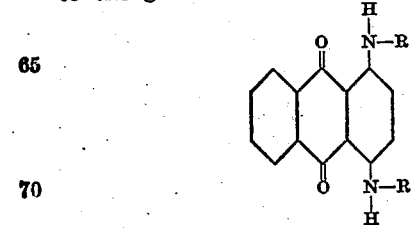

wherein each R stands for a member of the group consisting of —OH, —NH₂, alkyl groups containing more than two carbon atoms, aralkyl groups containing more than 7 carbon atoms, and heterocyclic radicles.

17. 1,4-diaminoanthraquinones corresponding to the general formula:

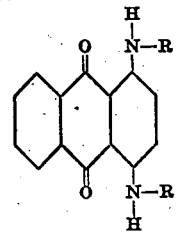

wherein each R stands for a heterocyclic radicle.

18. 1,4-diaminoanthraquinones corresponding to the general formula:

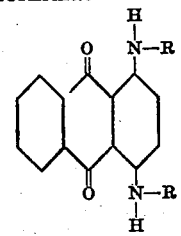

wherein each R stands for an alkyl group containing more than two carbon atoms.

19. The 1,4-diaminoanthraquinone corresponding to the formula:

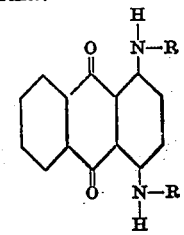

wherein each R stands for the radicle of carbazole.

20. A process of producing N-substitution products of 1,4-diaminoanthraquinones which comprises condensing a leuco compound of a 1,4-diaminoanthraquinone with at least two molecular proportions of a primary amine.

21. The 1,4-dibutyldiaminoanthraquinone corresponding to the formula

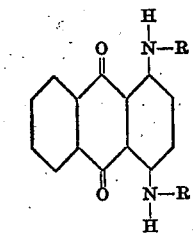

wherein each R stands for butyl.

22. The 1,4-dibenzyldiaminoanthraquinone corresponding to the formula

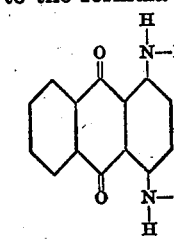

wherein each R stands for benzyl.

KARL KOEBERLE.
ROBERT SCHWEIZER.
CHRISTIAN STEIGERWALD.